United States Patent [19]
Carbrey

[11] 3,934,097
[45] Jan. 20, 1976

[54] MULTIFREQUENCY TONE DETECTION

[75] Inventor: Robert Lawrence Carbrey, Boulder, Colo.

[73] Assignee: Bell Telephone Laboratories, Incorporated, Murray Hill, N.J.

[22] Filed: Aug. 12, 1974

[21] Appl. No.: 496,695

[52] U.S. Cl............................. 179/84 VF; 328/138
[51] Int. Cl.².......................................... H04M 1/50
[58] Field of Search................ 179/84 VF, 15.55 R; 324/78 D; 328/138

[56] References Cited
UNITED STATES PATENTS

| | | | |
|---|---|---|---|
| 3,441,682 | 4/1969 | Pasternack | 179/84 VF |
| 3,514,697 | 5/1970 | Oswald | 324/78 D |
| 3,573,613 | 4/1971 | Oswald | 324/77 |
| 3,578,919 | 5/1971 | O'Neill | 179/84 VF |

OTHER PUBLICATIONS

International Switching Symposium, MIT, Cambridge, Mass., S. G. Pitroda, "Digital Multifrequency Tone Receiver", June 1972, pp. 431–441.

*Primary Examiner*—Kathleen H. Claffy
*Assistant Examiner*—Joseph Popek
*Attorney, Agent, or Firm*—C. S. Phelan

[57] ABSTRACT

A method and apparatus for detecting multifrequency tones in a received signal by summing aperiodic samples and without using bandpass filters. In a receiver capable of detecting $m$ different tones each comprised of $n$ different frequencies, the apparatus performs $m$ parallel summations each of $2^n$ samples of the received signal. Each summation corresponds to a different detectable tone. In each summation, an initial sample is followed by samples delayed from it by respective half-periods of the frequencies comprising the corresponding tone and by samples delayed from the initial sample by combinations of different ones of such half-periods. The detection of a particular tone is indicated when the corresponding sum is zero and all other sums have finite values.

16 Claims, 5 Drawing Figures

MULTIFREQUENCY TONE DETECTION

FIELD OF THE INVENTION

This invention relates generally to multifrequency tone detection and, more specifically, to a method and apparatus for detecting the presence in a communication signal of any one of a plurality of tones each comprising a combination of discrete frequencies.

BACKGROUND OF THE INVENTION

It is a common practice in modern telephone systems to employ multifrequency tones for signaling and data communications. Conventional receivers for such tones require an individual, highly selective narrow-band filter for each frequency which can be a component of such a tone. The problem with using narrowband filters is that they tend to be bulky and expensive, even if they are of the time domain or phase-locked loop variety. Also, such filters do not readily lend themselves to large-scale integration because they usually require inductors and/or precise capacitors. Furthermore, since a plurality of such filters is required for a single receiver, the effect of these filters on bulk and price can be substantial.

In receiving tones, two distinguishable operations are performed: tone detection and tone verification. Tone detection, conventionally performed by narrowband filters, is the process of determining that a particular tone is present in a received signal. Tone verification is the process of confirming that a bona fide tone has been received and can include such operations as testing for the presence of the detected tone for some minimum time period and checking that the relative amplitudes of component frequencies are within some predetermined ratio. The instant invention involves tone detection.

It is an object of this invention to perform multifrequency tone detection in a manner that will not require the use of highly selective narrowband filters.

It is another object of this invention to perform multifrequency tone detection in a manner that facilitates manufacture by high-density integrated circuit techniques.

SUMMARY OF THE INVENTION

According to the invention, any one of $m$ tones, each comprising $n$ different frequencies, not harmonically related, is detected in a received signal by performing $m$ summations, each corresponding to one of the detectable tones and containing $2^n$ aperiodic samples of the received signal. The sampling times within each summation are selected to cause the summation corresponding to the tone present in the received signal to be the only one having essentially zero value.

In sampling the received signal, the first sample, which is included in every summation, is taken at some arbitrary starting time $t = 0$. Each summation includes subsequent samples taken at each instant delayed from the first sample by a half-period of a different one of the frequencies comprising the corresponding tone and additional samples taken at instants delayed by combinations of different ones of such half-periods. Consequently, a summation corresponding to a tone comprised of three frequencies having periods of $T_1$, $T_2$, $T_3$, contains samples taken at times 0, ½ $T_1$, ½ $T_2$, ½ $T_3$, ½$(T_1 + T_2)$, ½$(T_1 + T_3)$, ½$(T_2 + T_3)$ and ½$(T_1 + T_2 + T_3)$. Each summation is completed upon the addition of its last sample taken at an instant corresponding to the sum of all the component half-periods, and, upon the completion of all summations and the identification of the vanishing summation, a single detection is completed.

It is a feature of this invention that the one summation which vanishes is identified to indicate the tone which was present in the received signal.

It is a feature of a first embodiment of the invention that the samples corresponding to each detectable tone are cumulatively added to form a distinct partial summation, that each partial summation is stored in a distinct segment of a storage means, that new samples, upon formation, are added to appropriate partial summations requiring respective ones of such samples and that the new summations thus formed are stored back into the appropriate segments of the storage means.

It is a feature of a second embodiment of this invention that samples of a received signal are stored in unique segments of a storage means and that the contents of all segments including samples corresponding to the components of a single sample summation are simultaneously applied to a summation means to form each sample summation.

BRIEF DESCRIPTION OF THE DRAWING

The aforementioned and other objects and features of the invention are better understood by reference to the drawing in which.

DETAILED DESCRIPTION

Figure 1:
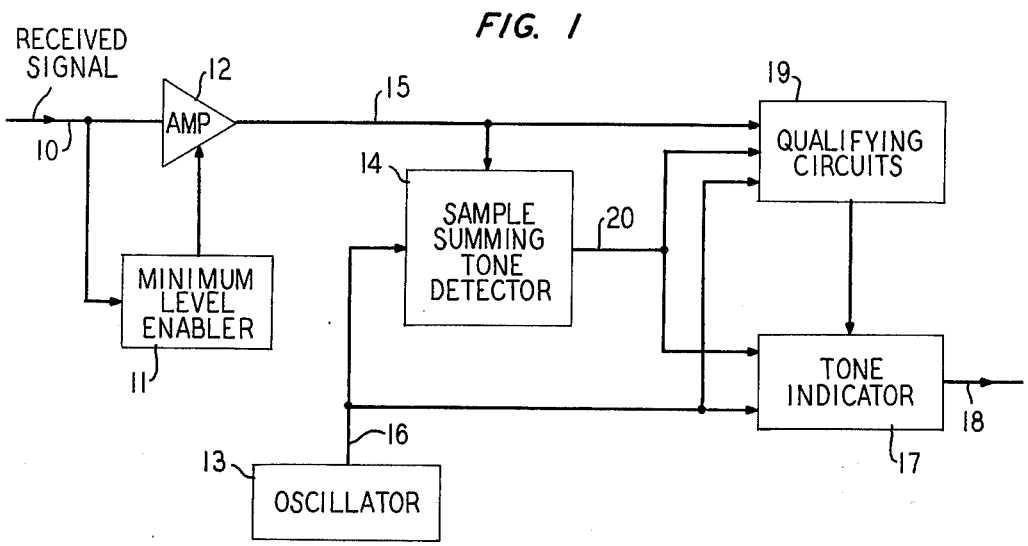
FIG. 1 is a functional block diagram demonstrating how the apparatus of the invention is employed.

Multifrequency tone signals employed in communication systems are typically a superposition of a plurality, $n$, of component signals having nonharmonically related frequencies, each selected from a plurality of possible frequencies. The "value" of the tone signal at any point in time is determined by the particular combination of frequencies assumed by the component signals, each distinct combination being referred to as a tone. Exemplifying the component signals as sinusoids, it is clear that, when the $j^{th}$ tone $S_j(t)$ is present, a received tone signal $R(t)$ can be represented mathematically by $$R(t) = S_j(t) = \sum_{i=1}^{n} A_{ji} \sin 2\pi f_{ji} t \qquad (1)$$

where $A_{ji}$ is the amplitude of the $i^{th}$ component of $S_j(t)$ and $f_{ji}$ is its frequency.

It has been found that the sum of $2^n$ samples of a tone signal, comprised as in equation (1), will have zero value if the samples are taken at intervals, to be specified, related to the periods of the component signals.

According to the method of the invention, the presence in a received signal of any one of $m$ possible multifrequency tones, comprised as above, can be detected by selectively combining aperiodic samples of the tone signal to form a plurality of parallel summations and sensing which summation assumes zero value. More specifically, the method includes the following steps:

1. Sampling the received signal at some arbitrary starting time $t = 0$, at every subsequent instant corresponding to a half-period of the component signals, and at subsequent instants each corresponding to a combination of different half-periods; and 2. For each of $m$ groups of $2^n$ selected ones of these samples, performing a cumulative sample summation corresponding to a different receivable tone, including in each summation the initial sample, samples taken at instants delayed from the initial sample by respective half-periods of the component signals of that tone and samples taken at instants delayed by combinations of different half-periods.

When this process is completed, if one summation has approximately zero value, the presence of the corresponding tone in the received signal is indicated.

Two specific methods for performing the summation in step (2) of the above procedure are illustratively disclosed. These are named according to the manner of adding component samples. The first method, called sequential summation, is performed by independently storing intermediate values (partial summations) of each of the cumulative summations and sequentially adding new values to each summation requiring them as new samples are taken. The second method, called simultaneous summation, is performed by independently storing the samples taken at the specified intervals and simultaneously adding all of the samples required for a given summation upon receipt of the last sample for that summation.

It should also be noted that the method of the invention is not limited to the use of component signals that are sinusoids. On the contrary, any periodic signal whose alternate half-periods are equal and opposite will work equally well.

FIG. 1 illustrates a typical manner in which the invention is employed to receive multifrequency tone signals. A received signal, including multifrequency tones, is coupled to automatic gain control (AGC) amplifier 12 and minimum level enabler 11 via lead 10. Enabler 11 is a threshold circuit, of any conventional type responsive to a received signal in excess of a predetermined amplitude to enable AGC amplifier 12. AGC amplifier 12 is a circuit type commonly used in the art to regulate amplitude variations in a signal. Consequently, the signal produced on lead 15 is a replica of the received signal with all signal strength fluctuations removed. This constitutes the ideal signal for application of the method of the invention, since amplitude fluctuations could cause errors in sample summation values or could, possibly, result in the inability to achieve a null summation.

Oscillator 13 provides a continuous stream of clock pulses at a much higher frequency than any component of a receivable tone. This oscillator can be of any conventional type. The clock pulses are used in operating all the logic circuits in the tone receiver.

Sample summing tone detector 14 is the apparatus of the invention. Under control of the clock pulses coupled via lead 16, detector 14 employs the previously described method to sense the presence of a multifrequency tone in the signal appearing on lead 15. In the output signal of detector 14, one binary digit (bit) corresponds to each receivable tone, the binary state of each bit indicating whether the corresponding tone is present or absent. Clearly, these bits could be produced sequentially or in parallel. In all of the embodiments of detector 14 described hereafter, it is assumed that the bits are produced sequentially. Hence, the output signal of detector 14, appearing on lead 20, is a sequence of bits, each bit position in the sequence corresponding to a different receivable tone. In this sequence the bit corresponding to the tone present in the received signal has a first binary state (here assumed ONE) and all other bits have a second binary state (here assumed ZERO).

Tone indicator 17 and qualifying circuits 19 together perform the function of tone verification, previously described. Circuits performing the functions of indicator 17 and circuits 19 are known to the art and their details are not part of the present invention. Under control of clock pulses from oscillator 13, qualifying circuits 19 sense the outputs of sample summing tone detector 14 and the multifrequency tone signal appearing, respectively, on leads 20 and 15, to determine whether a bona fide tone is present. Qualifying circuits 19 typically perform such functions as ensuring the persistence of a single tone on lead 20 for some minimum time period (usually corresponding to the time required for a plurality of repeated detections) and guaranteeing that the relative amplitudes of the component frequencies of the received tone are within some predetermined range of ratios. These operations are performed in a time-interleaved fashion on all the bit positions in the signal appearing on lead 20. When all of the requirements of qualifying circuits 19 have been met by a specific digit position of the bit sequence on lead 20, tone indicator 17 indicates on lead 18 that the corresponding tone was present in the received signal.

Figure 2:
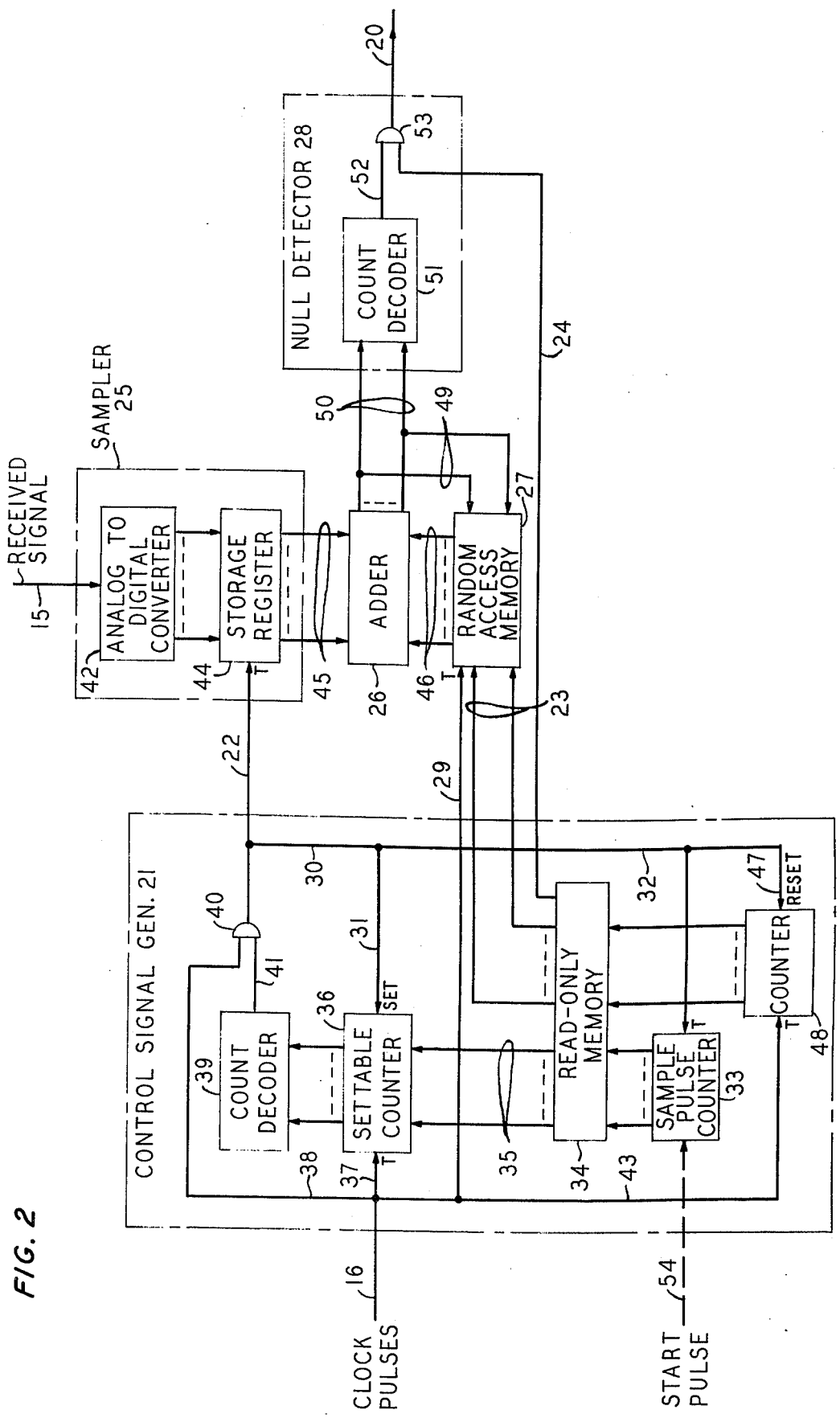
FIG. 2 is a logic diagram of a sample summing tone detector embodying the sequential summation method.

FIG. 2 is a schematic diagram of an embodiment of a sample summing tone detector employing sequential summation. This detector broadly comprises control signal generator 21, sampler 25, adder 26, random access memory 27 and null detector 28. Under control of the clock pulses applied via lead 16, control signal generator 21 produces an aperiodic sampling pulse sequence controlling sampler 25 via lead 22, an address word sequence for controlling random access memory 27 via leads 23 and a signal enabling null detector 28 via lead 24.

Read-only memory (ROM) 34 is the key element in control signal generator 21. It is divided into a plurality of areas addressed by the enumeration of counter 33, each area including a plurality of cells each addressed by a different enumeration of counter 48. Each cell stores a binary word defining the time of taking the next sample, the address of memory 27 to be accessed and whether or not null detector 28 is to be enabled. When a particular cell is accessed through the production of area and cell addresses, its stored word is produced as the output word of the ROM (i.e., the composite of the words appearing on leads 35, 23 and 24). The portion of the output word appearing on leads 35 is the same for all the cells in an area and so is determined solely by the enumeration of counter 33 to control the time interval between successive sampling pulses produced on lead 22. The portion of the output word appearing on leads 23 and 24 is determined jointly by both enumerations applied to ROM 34. For each enumeration of counter 33, the address on leads 23 can change with each different enumeration of counter 48 thereby accessing different segments of memory 27 and effecting the addition of each sample from sampler 25 to different partial summations where it is required. The signal on lead 24, enabling null detector 28, is ZERO in all cells except those addressed at the $2^n$th sample time of each summation.

Read-only memories are well known in the art and the detailed design of ROM 34 is not considered to be part of the present invention. The particular word which must be stored in each cell of ROM 34 is determined by associating the required sequence of output words with the known sequence of input addresses.

A detection cycle begins when sample pulse counter 33 achieves its lowest (all-ZEROs) count. In FIG. 2, counter 33 is assumed to be a recycling counter and will therefore repetitively achieve this count in the course of successive detections. However, it is also possible to use a counter which stops counting upon reaching its maximum count, in which case a start pulse must be applied to force a reset of the counter by the next sample pulse. This alternative is represented by dashed line 54. In either case, a sampling pulse produced by AND gate 40 (in the manner to be described) is coupled to counter 33, via leads 30 and 32, driving it to its lowest count on the leading pulse transition. As a result, a predetermined word is presented to settable counter 36 via leads 35. The same sampling pulse, coupled via leads 30, 32 and 47, resets counter 48 to the all-ZEROs count. With counter 48 in this state, the work produced on leads 23 disables all reads and writes in random access memory 27, and the signal produced on lead 24 can contain no enable pulses. The trailing transition of the sampling pulse, coupled via leads 30 and 31, sets counter 36 to the number appearing on leads 35. Control signal generator 21 is now initialized and the normal detection operation follows.

In operation, counter 33 is incremented by the leading transition of each sampling pulse until an automatic reset is achieved at a maximum enumeration equal to one less than the total number of sampling pulses (i.e. the maximum count equals $p + C$, where $p$ is the total number of component frequencies and $C$ is the total number of different combinations of component frequencies that can occur in receivable tones). Each sample pulse also resets counter 48 which is incremented by trailing transitions of clock pulses coupled via lead 43. As counter 48 steps through its counting sequence, each cell in the area of ROM 34 addressed by counter 33 is accessed. This effects sequential access of different segments of memory 27.

Counter 48 has a maximum count of $m + 1$ when there are $m$ receivable tones and includes logic which will hold it at its maximum count, once achieved, until a reset pulse is applied at lead 47. While counter 48 is at its maximum count, the signal produced on leads 23 disables reading and writing of memory 27 and the signal on lead 24 includes no enable pulses. The signal on leads 35 is unaffected by counter 48.

Settable counter 36, count decoder 39 and AND gate 40 effectively comprise a variable delay element which, under control of the signal appearing on leads 35, delays, by an integral number of clock pulse periods, sampling pulses coupled from the output of AND gate 40 via leads 30 and 31, counter 36 and decoder 39 back to gate 40. When a sample pulse occurs on lead 31, settable counter 36 is set to a count corresponding to the word appearing on leads 35. Thereafter, counter 36 continues counting clock pulses coupled to it via lead 37. Count decoder 39 senses the count of counter 36 and enables AND gate 40 via lead 41 when a predetermined count, for example, the all-ONE count, is achieved by counter 36. Consequently, a single clock pulse, coupled via lead 38, is passed through AND gate 40. It should be clear that this pulse is a sampling pulse. Clearly, the difference between the number appearing on leads 35 and the count decoded by decoder 39 determines the number of clock pulses occurring between sampling pulses. Consequently, to produce sampling pulses at the instants required by the method of the invention, specific words must be stored in the cells of read-only memory 34 which will produce the correct number on leads 35 for each enumeration of counter 33.

Sampler 25 samples and holds the received signal applied via lead 15 each time a sampling pulse appears on lead 22. In operation, analog-to-digital converter 42 converts the amplitude of the received signal appearing on lead 15 to its binary number representation. When a sampling pulse appears on lead 22, this binary number is stored in storage register 44 and displayed on leads 45. This binary number is retained in the register until a new sampling pulse occurs. Both analog-to-digital converter 42 and storage register 44 are standard logic components well-known to the art and, generally, commercially available.

Adder 26 and random access memory 27 interact to produce all of the sample summations. Adder 26 adds the sample, coupled via leads 45, to any prior accumulations (partial values) of the sample summations stored in random access memory 27 and coupled to adder 26 via leads 46. Random access memory 27 incorporates $m$ independent storage segments each dedicated to storage of partial values of a different sample summation and each addressable through the production of a unique address word on leads 23. Clock pulses on lead 16, extended to random access memory 27 via lead 29, effect a read-from memory followed by a write-into memory on successive clock pulse transitions. This results in adder 26 producing an updated partial sum value on the leading transition of a clock pulse and in the storage of this updated partial sum, via leads 49, upon the occurrence of the trailing clock pulse transition. In accordance with this embodiment, the occurrence of a sampling pulse initiates a sequence of address words, on leads 23, the appearance of the words coinciding with successive trailing clock pulse transitions. Each word is read into an address register, included in memory 27, when the next leading clock pulse transition occurs and effects the addition of the sample to a different summation which is supposed to include that sample. In this manner, the sample summations are formed on a time-division basis.

Each newly updated summation is provided to null detector 28 via leads 50. Count decoder 51 senses these summations provided by adder 26 and indicates when the value of such summations is within some predetermined range of zero (positive and negative values are possible) by producing a signal having a first binary state (here assumed ONE). Assuming for example that $j$ bits are produced by adder 26 and that adder 26 produces sums in two's complement arithmetic, count decoder 51 need merely sense the occurrence of the all-ONE or all-ZERO state in the $j-i$ most significant bits to detect summations in the null range $-2^i$ to $2^i-1$. The occurrence of an enabling pulse on lead 24 permits the signal produced by count decoder 51 to be passed through AND-gate 53 to output lead 20. These enabling pulses are produced on lead 24 coincident with each sampling pulse corresponding to the last sample of a summation. Thus, the null detector enabling signal includes a pulse coincident with each of the last $m$ sampling pulses in a detection operation.

Counters (33, 36 and 48), count decoders (39 and 51), AND-gates (40 and 53), an adder (26) and a random access memory (27) are all logic components well-known to the art. Read-only memories are also well-known to the art; however, predetermined words must be stored in specific cells of read-only memory 34 to enable null detector 28 at the correct times; to produce the correct addresses on leads 23 at all times; and to provide numbers on leads 35 that will result in a sequence of sample pulses correctly spaced. This can be reduced to the problem of producing the desired word at the output leads of read-only memory 34 for each input word jointly produced by counters 33 and 48. The correct output word is arrived at by determining the signals required at leads 23, 24 and 35 for every possible input address. Once this correspondence is established by truth table, it becomes apparent what word must be stored in each cell of ROM 34.

Figure 3:
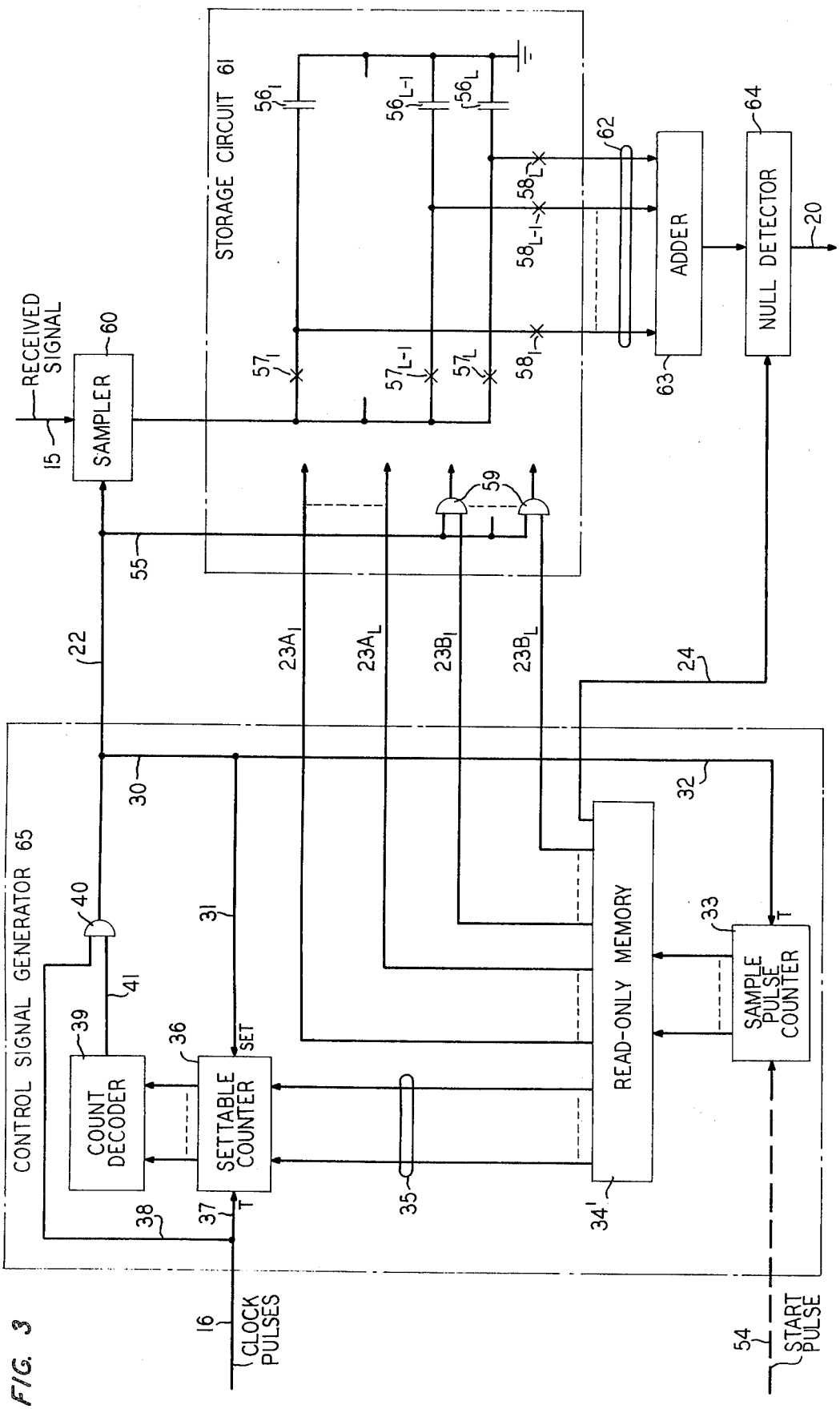
FIG. 3 is a logic diagram of a sample summing tone detector embodying the simultaneous summation method.

FIG. 3 is a circuit diagram of a sample summing tone detector embodying the simultaneous summation method. The detector broadly comprises control signal generator 65, sampler 60, storage circuit 61, adder 63 and null detector 64. The function of control signal generator 65 is identical to that of control signal generator 21 of FIG. 2, i.e., under control of clock pulses coupled via lead 16 it produces sampling pulses on lead 22, addresses for storage circuit 61 on leads $23A_1$-$3A_L$ and $23B_1$-$23B_L$ (hereafter called leads 23A and 23B, respectively, when referenced as a group) and an enable signal for null detector 64 on lead 24.

Control signal generator 65 is identical to control signal generator 21 of FIG. 2 except for the elimination of counter 48 and the use of a different arrangement of words in ROM 34' than in ROM 34. Counter 48 is eliminated because, as will be explained subsequently, each sample is stored separately and the simultaneous summation of samples obviates the need to distribute one sample to different storage segments. Read-only memory 34' in FIG. 3 has a different word layout than the corresponding component in FIG. 2 because the addressing requirements of storage circuit 61 are different than those of random access memory 27. In particular, circuit 61 requires addresses at only the sample rate as compared with the multiple changes per sample interval required by memory 27 of FIG. 2. The particular arrangement of words in ROM 34' is arrived at by the same method previously described for ROM 34. Because of the virtual identity of the two control signal generators, no further description is warranted here of the detailed operation of generator 65.

The signals produced on leads 22 and 24 are the same as in FIG. 2. Addresses produced on leads 23A effect storage of L samples from sampler 60 during one detection operation ($L = p+C+1$, where $p$ is the total number of component frequencies and $C$ is the total number of combinations of component frequencies appearing in receivable tones). The L-bit address words each have a single ONE bit, the single One bit being in a different position in each word. Thus, by dedicating a different bit to the control of a different segment of circuit 61, each address word effects storage into a different single segment. The L-bit readout address words produced on leads 23B each have a different arrangement of $2^n$ ONEs and thus each will effect simultaneous readout of $2^n$ different segments. However, this will not happen until the last sample for each summation occurs, so the readout addresses are all in the all-ZERO state until the last $m$ of the words on leads 23A occur.

Under control of sampling pulses coupled via lead 22, sampler 60 produces samples of the received signal coupled via lead 15. Sampler 60 is an analog sample-and-hold gate of any conventional type having a sufficiently low impedance fully to charge any of capacitors 56 in one sampling interval.

Figure 4:
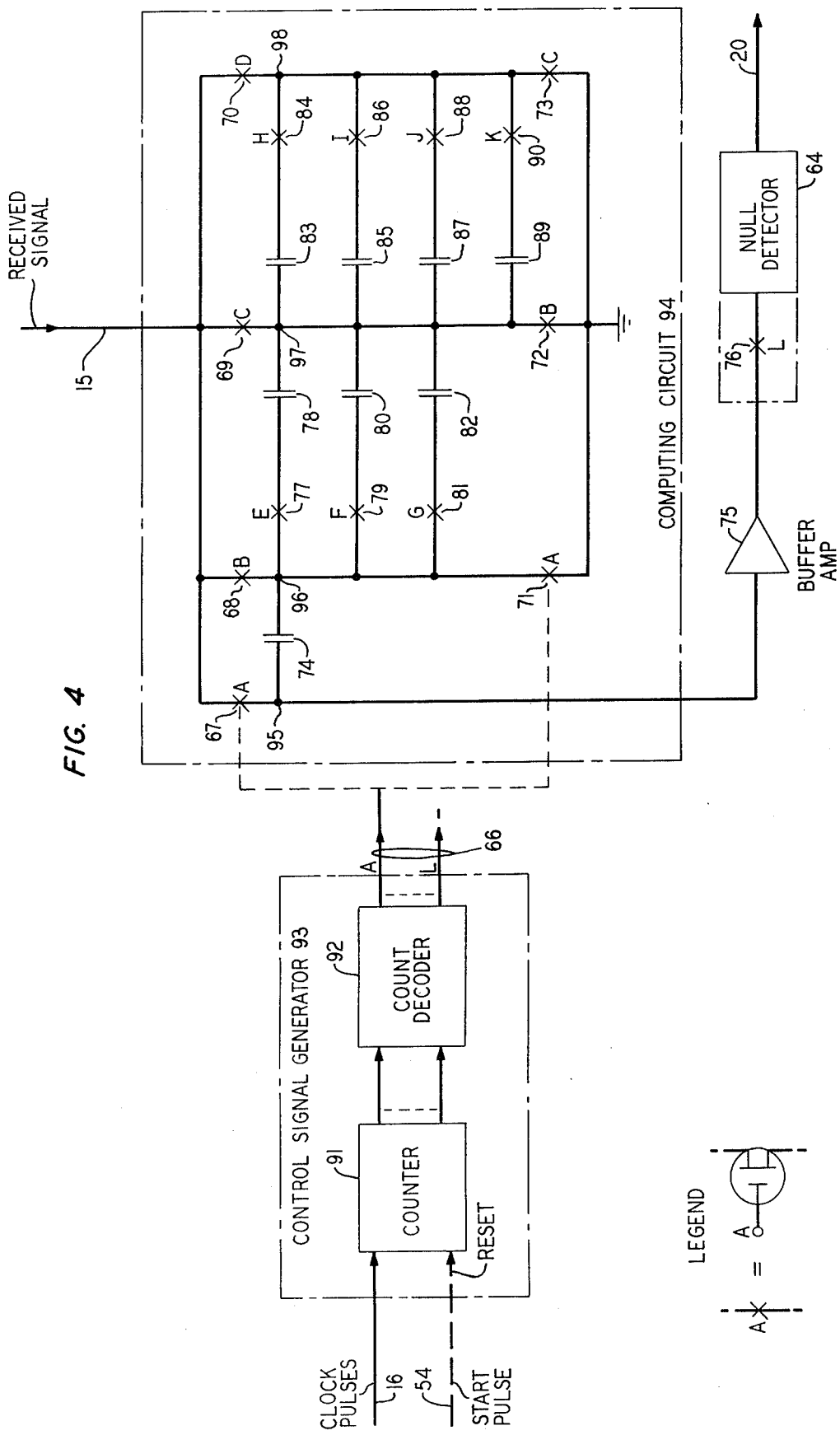
FIG. 4 is a schematic diagram of a sample summing tone detector embodying the simultaneous summation method and useful in detecting two-frequency telephone signaling tones.

Storage circuit 61 stores each sample produced by sampler 60 and displays predetermined groups of $2^n$ of these samples to adder 63 on leads 62. Each of storage capacitors 56 comprises a different segment of storage circuit 61 and is dedicated to a unique sample produced in the course of a detection operation. Capacitors 56 are connected to a common ground at one end. Each of normally open, controlled switches 57 permits storage in the capacitor having the same subscript when closed by the appearance of a ONE on the one of leads 23A having the same subscript. Switches 57 and 58 may be of any conventional type, for example, insulated-gate field-effect transistors employed in the well-known transmission gate configuration in which a signal applied to the gate of the device controls transmission between its drain and source. This is represented by the legend of FIG. 4. In practice, each of switches 57 is closed in turn by sequencing the ONE bit through each of leads 23A in successive address words, thus permitting sequential storage of samples. Sampler 60 holds samples between successive sampling pulses. With each new count of counter 33, a new address appears on leads 23A (the ONE bit is moved) and one of switches 57 is closed to permit charging of the corresponding capacitor.

After all samples have been stored, the reading out of each of capacitors 56 is achieved by closing the one of switches 58 having the same subscript by producing a ONE bit on the one of leads 23B having the same subscript. The transmission through AND-gates 59, enabled by sampling pulses coupled via lead 55, guarantees that readouts will occur only during sampling pulses. In operation, a group of $2^n$ of capacitors 56 is read out simultaneously; every such group of capacitors contains all of the samples required by the method of the invention for one of the summations.

The group of samples read out of storage circuit 61 is applied to adder 63 via leads 62 coincidentally with the appearance of the last sample of the group. Adder 63 produces a signal which has an amplitude equal to the sum of the samples. Adder 63 is an analog adder of any conventional design; for example, an operational amplifier in the well-known summing configuration. It has been assumed here that adder 63 has high impedance inputs to prevent discharging capacitors 56. If it does not, it is necessary to insert isolation amplifiers of any conventional type between storage circuit 61 and adder 63.

Null detector 64 is enabled by pulses, coinciding with the last sample of each group and appearing in the signal on lead 24. It responds to adder outputs in some predetermined range about zero by producing, on lead 20, a signal having a first binary state (here assumed ONE); the signal having the opposite binary state otherwise. Null detector 64 may be of any conventional design; for example, a pair of comparators straddling zero amplitude. Control of null detection via lead 24 is achieved by gating the signal from adder 63.

FIG. 4 is a schematic diagram of a sample summing tone detector embodying the simultaneous summation method and useful in detecting two-frequency telephone signaling tones. On a telephone pushbutton pad, the pushbuttons are arranged in three columns each including four buttons and a different two-frequency tone is produced by pushing each button. This is accomplished by assigning a different frequency to each column and row (hereafter called column and row frequencies) of the pushbutton pad and producing the combination of the corresponding column and row frequencies when a particular button is pushed. The column frequencies will here be designated, in order of decreasing frequency, as $1/T_1$, $1/T_2$ and $1/T_3$ and the row frequencies, also in decreasing order, as $1/T_4$, $1/T_5$, $1/T_6$ and $1/T_7$.

In a sample summing tone detector for telephone signaling tones, each sample summation comprises four samples, e.g., the summation corresponding to the tone constituting the frequency pair ($1/T_1$, $1/T_4$) comprises samples taken at times, $t$, equal to 0, ½ $T_1$, ½ $T_4$ and ½($T_1+T_4$). The formation of all such four sample summations requires a set of 20 samples comprising: the initial sample, a sample at each instant delayed from the initial sample by a component half-period (seven half-period samples in all) and a sample at each instant delayed from the initial sample by the sum of a column and a row half-period (12 combined half-period samples in all).

In the embodiment of FIG. 4, the initial sample and each of the half-period samples are stored on a different storage capacitor. Each of the combined half-period samples corresponds to the final sample in a different summation, so each summation is formed simultaneously with the taking of its last sample. This is accomplished at each combined half-period instant by connecting in series the capacitors storing the initial sample and each of the half-period samples and placing this series capacitor string in series with the source of the received signal, e.g., at $t = $ ½ ($T_1+T_4$) the capacitors storing the 0, ½ $T_1$ and ½ $T_4$ samples are placed in series with the received signal. In this manner each sample summation is formed as its final sample is received.

Control signal generator 93 is responsive to clock pulses applied via lead 16 to produce, on leads 66, a sequence of binary words which controls the operation of computing circuit 94 and switch 76. This sequence of binary words comprises a plurality of parallel binary signals A through L represented in the timing diagram of FIG. 5 as waveforms A through L. In FIG. 4 leads 66 have been labeled A through L to indicate the particular leads on which each signal is produced. It should be noted that time is not scaled in FIG. 5. Thus, although the indicated time instants have been drawn equally spaced for convenience, they are in reality unequally spaced. The clock pulses, however, are equally spaced in time.

In control signal generator 93, counter 91 marks progress through a detection operation by counting clock pulses coupled via lead 16. Clearly, it must have a maximum count large enough to accommodate the total number of clock pulses occurring during a single detection operation. The minimum acceptable clock frequency is fixed, in the context of the entire tone identification process, by the resolution required in distinguishing the sampling instants of interest in the method of the invention. In the present implementation, it is assumed that counter 91 is of any conventional type and is self-resetting to permit repetitive detections; however, detections could equally well be externally controlled by resetting with start pulses, as indicated, on dashed lead 54.

Count decoder 92 is a type of logic circuit well-known to the art. Briefly, such a decoder comprises an arrangement of logic gates which responds to particular count conditions in counter 91 to develop a value (ONE or ZERO) for each of the outputs A–L, the sequence of such values forming each of the waveforms A–L of FIG. 5. This, of course, requires that each of the time instants indicated on the time axis of FIG. 5 be associated with a unique count of counter 91.

Computing circuit 94 operates in two distinct modes: the storage mode in which individual samples are stored on storage capacitors; and the summing mode in which sample summations are formed by the series connection of storage capacitors as previously explained. Thus, computing circuit 94 incorporates the functions of sampler 60, storage circuit 61 and adder 63 of FIG. 3.

In FIG. 4, capacitor 74 is dedicated to the storage of the initial sample. Capacitors 78, 80 and 82 are dedicated to the storage of samples delayed from the initial sample by a half-period of a column frequency and, hence, will be called column capacitors. Likewise, capacitors 83, 85, 87 and 89 store samples delayed from the initial sample by a half-period of a row frequency and will be called row capacitors.

Figure 5:
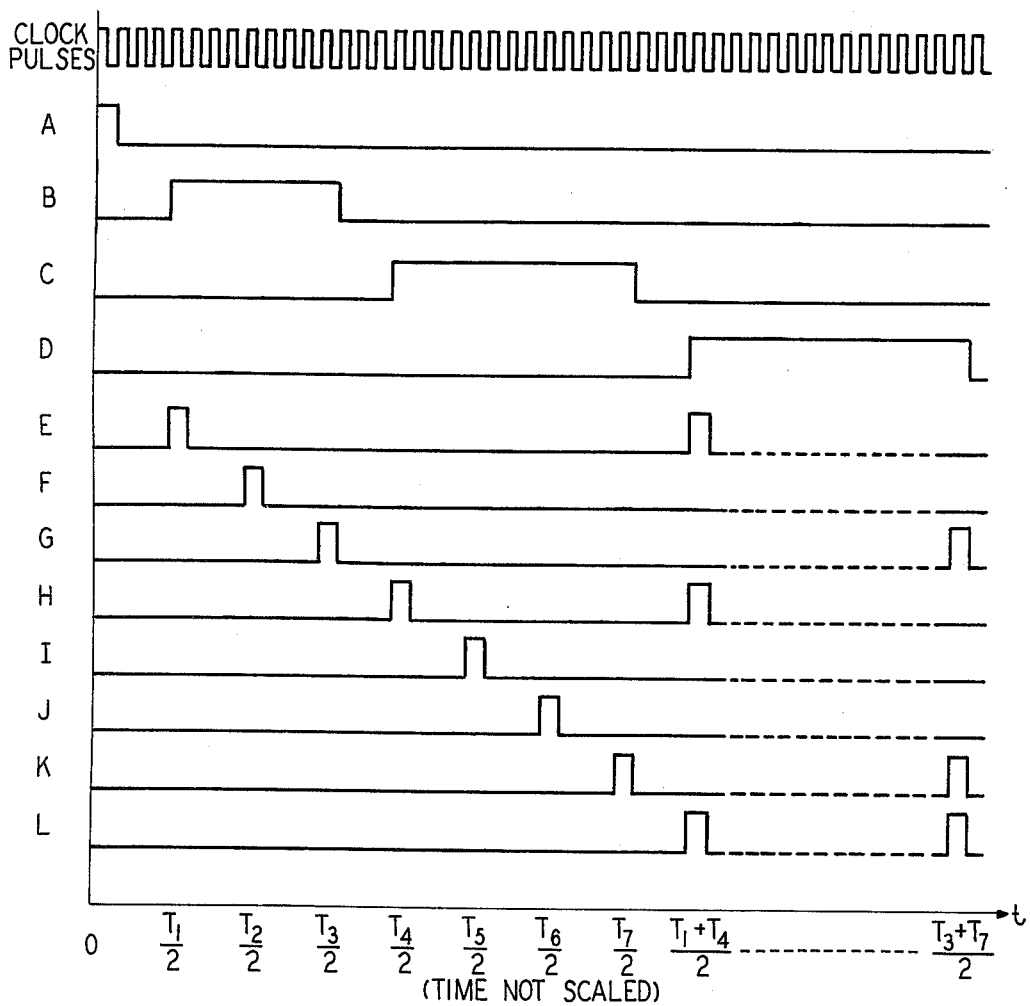
FIG. 5 is a waveform diagram helpful in explaining the illustrative embodiment of FIG. 4.

The operation of computing circuit 94 is best explained with the aid of FIG. 5 which depicts the binary control signals, produced by generator 93 on leads 66, as waveforms A through L having a common time base. As indicated by the legend of FIG. 4, the normally open switches controlled by control signals A through L are here assumed to be insulated-gate field-effect transistors (IGFETs) operated as transmission gates. It is further assumed that the occurrence of a binary ONE value in any control signal will effect closing of all switches bearing the same letter designation as the control signal.

A detection operation begins with the storage in capacitor 74 of an initial sample of the received signal coupled to computing circuit 94 via lead 15. Capacitor 74 is connected between nodes 94 and 96, switch 67 is connected between lead 15 and node 95, and switch 71 is connected between node 96 and ground. Hence, when the pulse appears in waveform A at $t = 0$, capacitor 74 is charged to the amplitude of the received signal through the closure of switches 67 and 71. When the pulse in waveform A disappears, this charge is retained on capacitor 74. Column capacitors 78, 80 and 82 are connected between nodes 96 and 97 through switches 77, 79 and 81, respectively; switch 68 connects node 96 to lead 15; and switch 72 connects node 97 to ground. Hence, while waveform B goes high, closing switches 68 and 72, pulses in waveforms E, F and G effect storage of samples in capacitors 78, 80 and 82, respectively, through the sequential closure of switches 77, 79 and 81.

Row capacitors 83, 85, 87 and 89 are connected between nodes 97 and 98 through switches 84, 86, 88 and 90, respectively; switch 69 connects node 97 to lead 15; and switch 73 connects node 98 to ground. Hence, while waveform C goes high, closing switches 69 and 73, pulses in waveforms H, I, J and K effect storage of samples in capacitors 83, 85, 87 and 89, respectively, through the sequential closure of switches 84, 86, 88 and 90.

The summation mode of operation begins at $t = \frac{1}{2}(T_1+T_4)$ while waveform D goes high connecting node 98 to lead 15 through the closure of switch 70. At the same time pulses occurring in waveforms E and H effect the series connection of capacitors 74, 78 and 83 between nodes 95 and 98 through the simultaneous closure of switches 77 and 84. This produces the first sample summation at node 95. The simultaneous pulse in waveform L permits the summation to be transmitted to null detector 64 through switch 76. Additional summations are formed through serial connection of different combinations of row and column capacitors between nodes 96 and 98, each such summation being accompanied by a pulse in signal L. Finally, at $t = \frac{1}{2}(T_3+T_7)$ capacitors 82 and 89 are connected in series between nodes 96 and 98 producing the last sample summation. Again, a pulse is produced in waveform L, terminating the detection operation.

Buffer amplifier 75 provides isolation between computing circuit 94 and null detector 64 to prevent discharging the storage capacitors. This amplifier could be, for example, an IGFET employed in the well-known source follower configuration.

Null detector 64 is identical to the correspondingly numbered element of FIG. 3. In FIG. 4, the series gate for enabling null detector 64 is merely shown separately in the form of IGFET switch 76. The dashed extension of null detector 64 to include switch 76 is meant to signify that the switch is actually part of the null detector.

It should be noted that the configurations of control signal generator 93 of FIG. 4 and control signal generator 65 of FIG. 3 are interchangeable. That is, either configuration could be used in either application when the detailed circuitry, specifically read-only memory 34 or count decoder 92, is configured to yield the desired control signals.

Although specific embodiments of this invention have been shown and described, it will be understood that various modifications may be made without departing from the spirit and scope of the principle thereof.

What is claimed is:

1. In a multifrequency tone receiver capable of detecting in a received signal any one of $m$ different tones each a superposition of $n$ component signals having different frequencies, the method of detecting said tones comprising the steps of:

taking a sample of said received signal at some arbitrary starting time and at subsequent sampling times delayed therefrom by half-periods and combinations of half-periods of different ones of said commponent signals, performing $m$ independent summations each summation associated with a different one of said tones, and including the starting time sample and $2^n-1$ additional samples delayed therefrom by half-periods and combinations of half-periods of the frequencies comprising the corresponding tone, the one summation having approximately zero value corresponding to the one of said tones present in the received signal.

2. The method of claim 1 in which said performing step comprises, for each summation:

sequentially accumulating the samples of such summation.

3. The method of claim 1 in which said performing step comprises:

independently storing each one of said samples and adding all the samples required for each one of said summations upon receipt of the last sample for that summation.

4. In a multifrequency tone detector including a plurality of storage capacitors the method of detecting the presence in a received signal of any one of $m$ tones, each tone being a superposition of $n$ component signals having different frequencies, comprising the steps of:

taking a sample of said received signal at an arbitrary starting time and at subsequent times delayed therefrom by half-periods and combinations of half-periods of different ones of said component signals, storing, in different ones of said storage capacitors, said starting time sample and each subsequent sample delayed therefrom by a combination of less than $n$ ones of said half-periods, at each final sampling time delayed from said starting time sample by a combination of $n$ of said half-periods, connecting in series a subgroup of said capacitors and transmitting through said subgroup the sample taken at said final sampling time, said subgroup comprising those capacitors storing the starting time sample and samples delayed therefrom by subcombinations of the half-periods constituting the delay of said final sampling time, sensing the amplitude of the signal transmitted through said capacitor subgroup at each final sampling time, and indicating when the summation of samples of one of said tones has approximately zero amplitude thereby detecting the presence of a tone whose component half-periods constitute the delay, from said starting time sample, of the final sampling time at which said zero value occurred.

5. In an apparatus capable of detecting the presence in a received signal of any one of $m$ tones each including $m$ different component frequencies, the combination of:

means for taking a sample of said received signal at some arbitrary starting time and at subsequent times delayed therefrom by half-periods and combinations of half-periods of different ones of said component frequencies and, means for independently combining the samples corresponding to each of said $m$ tones, the samples corresponding to a particular tone being the starting time sample plus those delayed therefrom by half-periods and combinations of half-periods of that tone's component frequencies.

6. An apparatus, responsive to a periodic sequence of clock pulses, for detecting in a received signal the presence of any of $m$ tones, each tone being a superposition of $n$ different component frequencies, said apparatus comprising:

means responsive to said clock pulses for generating first, second and third control signals, means enabled by said first control signal for taking a sample of said received signal at some arbitrary starting time and at subsequent times delayed therefrom by half-periods and combinations of half-periods of different ones of said component frequencies, means responsive to said second control signal for independently combining the samples corresponding to each of said $m$ tones, the samples corresponding to a particular tone being the starting time sample plus those delayed therefrom by half-periods and combinations of different half-periods of that tone's component frequencies, and means enabled by said third control signal for indicating when sample combinations produced by said combining means achieve an approximately zero value.

7. The apparatus of claim 6 in which said generating means comprises:
a sample pulse counter responsive to transitions in said first control signal said sample pulse counter having a maximum enumeration coextensive with the total number of said samples taken in performing a detection,
a clock pulse counter, resettable by pulses in said first control signal, said clock pulse counter having a maximum enumeration of $m+1$,
means jointly responsive to the enumerations of said sample pulse counter and said clock pulse counter to produce a delay count, said second control signal and said third control signal, and
variable delay means jointly responsive to said clock pulses and pulses in said first control signal for delaying pulses in said first control signal by the number of clock pulse periods determined by said delay count to produce subsequent pulses in said first control signal.

8. The generating means of claim 7 in which said variable delay means comprises:
means settable to said delay count upon the occurrence of a transition of a pulse in said first control signal for counting said clock pulses, and
means responsive to a predetermined enumeration of said settable counting means to produce a pulse coincident therewith, the sequence of such pulses comprising said first control signal.

9. The apparatus of claim 6 in which said generating means comprises:
a sample pulse counter responsive to transitions in said first control signal having a maximum enumeration coextensive with the total number of said samples taken in performing a detection,
means responsive to the enumeration of said sample pulse counter to produce a delay count, said second control signal and said third control signal, and
variable delay means jointly responsive to said clock pulses and pulses in said first control signal for delaying pulses in said first control signal by the number of clock pulse periods determined by said delay count to produce subsequent pulses in said first control signal.

10. The generating means of claim 9 in which said variable delay means comprises:
means settable to said delay count upon the occurrence of a transition of a pulse in said first control signal for counting said clock pulses, and
means responsive to a predetermined enumeration of said settable counting means to produce a pulse coincident therewith, the sequence of such pulses comprising said first control signal.

11. The apparatus of claim 6 in which said generating means comprises:
means for counting said clock pulses having a maximum enumeration which occurs within a predetermined time allotted for detecting a tone, said maximum enumeration being sufficiently large for said counting means to produce different enumerations during respective instants when said samples are taken, and
count decoding means responsive to the enumeration of said counting means to provide said first, second and third control signals.

12. The apparatus of claim 6 in which said sample-taking means comprises:
an analog-to-digital converter responsive to said received signal for providing a plurality of output bits representative of the amplitude of said recevied signal, and
a register responsive to said first control signal for storing the output bits of said analog-to-digital converter.

13. The apparatus of claim 6 in which said combining means comprises:
means for adding each of said samples to accumulations of preceding samples, to produce updated accumulations, and
segmented means responsive to second control signal for storing updated accumulations produced by said adding means, said stored updated accumulations being provided as the accumulation of preceding samples to said adding means, each segment of said storage means being dedicated to a unique one of said $m$ tones, and the segment addressed at any instant being determined by the value of said second control signal.

14. The apparatus of claim 6 in which said combining means comprises:
segmented means responsive to said second control signal for storing each of said samples in a unique segment and for simultaneously reading out the contents of $2^n$ segments, the particular segments stored in and read out at any instant being determined by the value of said second control signal, and
means for adding the contents read out from said $2^n$ segments.

15. An apparatus for detecting the presence in a received signal of any one of a plurality of multifrequency tones comprising:
means for generating a plurality of control signals,
an input terminal to which said received signal is applied,
a common terminal connected to ground potential,
a first storage capacitor,
first and second capacitor switches responsive to a unique one of said control signals for connecting, respectively, a first terminal of said capacitor to said input terminal and the second terminal of said capacitor to said common terminal,
a mode switch responsive to a unique one of said control signals and having two connection terminals to provide a continuity connection therebetween, one of said connection terminals being connected to said input terminal,
a plurality of two terminal storage networks serially connected between the second terminal of said storage capacitor and the free terminal of said mode switch, each of said networks comprising:

a plurality of storage capacitors connected at one end to the same storage network terminal, a plurality of switches each responsive to a unique one of said control signals for providing a connection between the free end of one of said capacitors and the free one of said storage network terminals, a plurality of network switch pairs, each pair responsive to a unique one of said control signals and dedicated to one of said storage networks, one switch in each pair providing a connection between a first terminal of the corresponding storage network and said input terminal, the remaining switch in each pair providing a connection between the second terminal of the corresponding storage network and said common terminal, a null detector having an input terminal and an output terminal, said detector indicating at its output terminal when a signal applied at its input terminal exceeds some predetermined value, and an output switch responsive to a unique one of said control signals to connect the first terminal of said first storage capacitor to the input terminal of said threshold detector.

16. The combination of claim 5 further comprising means for detecting when the combination of samples corresponding to any of said tones has approximately zero value thereby indicating the presence of such tone in said received signal.

* * * * *